US012565950B2

(12) United States Patent
Averett

(10) Patent No.: US 12,565,950 B2
(45) Date of Patent: Mar. 3, 2026

(54) TOOL AND METHOD FOR ONE-HANDED MANIPULATION AND PLACEMENT OF CONDUIT-JOINING SLEEVE

(71) Applicant: Anthem Aviation LLC, Chesapeake, VA (US)

(72) Inventor: Walter R. Averett, Chesapeake, VA (US)

(73) Assignee: ANTHEM AVIATION LLC, Chesapeake, VA (US)

( * ) Notice: Subject to any disclaimer, the term of this patent is extended or adjusted under 35 U.S.C. 154(b) by 65 days.

(21) Appl. No.: 18/594,075

(22) Filed: Mar. 4, 2024

(65) Prior Publication Data

US 2025/0277550 A1     Sep. 4, 2025

(51) Int. Cl.
F16L 23/00      (2006.01)
F16L 23/04      (2006.01)

(52) U.S. Cl.
CPC ............. F16L 23/003 (2013.01); F16L 23/04 (2013.01)

(58) Field of Classification Search
CPC ......... B23P 19/04; F16L 23/003; F16L 23/04; F16L 23/06; F16L 21/06; F16L 2201/10; F16L 25/0045
See application file for complete search history.

(56) References Cited

U.S. PATENT DOCUMENTS

| | | | | | |
|---|---|---|---|---|---|
| 3,828,403 | A | * | 8/1974 | Perrin ..................... | F16L 23/06 |
| | | | | | 24/270 |
| 5,815,892 | A | * | 10/1998 | Geppert .................. | F16L 23/04 |
| | | | | | 24/23 EE |
| 7,014,225 | B1 | * | 3/2006 | Goodsel .................. | F16L 23/04 |
| | | | | | 285/364 |
| 8,282,136 | B2 | * | 10/2012 | Vandal .................... | F16L 21/06 |
| | | | | | 285/112 |
| 8,925,969 | B2 | * | 1/2015 | Sonnier ................. | F16L 23/003 |
| | | | | | 285/82 |
| 9,259,812 | B1 | * | 2/2016 | Blanton ................ | F16C 33/046 |
| 10,508,668 | B2 | * | 12/2019 | Ikushima .................. | F16B 2/10 |
| 10,518,076 | B2 | * | 12/2019 | Christie ............ | A61M 39/1011 |
| 10,746,329 | B2 | * | 8/2020 | Pearman ................ | F16L 21/08 |
| 11,359,751 | B2 | * | 6/2022 | White ................ | A61M 39/1011 |
| 11,644,138 | B2 | * | 5/2023 | Sillitoe ................. | A61M 39/12 |
| | | | | | 285/81 |

(Continued)

*Primary Examiner* — Jason W San
*Assistant Examiner* — Matthew J Sullivan
(74) *Attorney, Agent, or Firm* — Peter J. Van Bergen

(57) ABSTRACT

A tool for one-handed operation includes an open-ended cylinder having two half-cylinders coupled at first circumferential ends thereof. A retainer, coupled to the open-ended cylinder, has a spring-bias to automatically couple the half-cylinders when second circumferential ends of the half-cylinders are in contact with one another. The retainer is operable by a single finger of a user's hand to overcome the spring-bias such that the half-cylinders may move relative to one another. A first axial end of the open-ended cylinder slidingly receives an open-ended sleeve, and a second axial end of the open-ended cylinder has an internal annular ledge that provides an annular seat for the open-ended sleeve. A set of apertures extend through radial walls of the open-ended cylinder with each aperture including a portion located a distance from the annular ledge that is greater than an axial length of the open-ended sleeve.

2 Claims, 9 Drawing Sheets

(56) References Cited

U.S. PATENT DOCUMENTS

| | | | | |
|---|---|---|---|---|
| 11,901,670 | B2 * | 2/2024 | Pearman | F16L 21/06 |
| 12,110,995 | B2 * | 10/2024 | Jenney | F16L 47/14 |
| 12,215,806 | B2 * | 2/2025 | Ball | F16L 23/003 |
| 12,270,473 | B2 * | 4/2025 | Kishi | F16J 15/061 |
| 12,276,361 | B2 * | 4/2025 | Scott | F16L 23/06 |
| 2004/0237632 | A1 * | 12/2004 | Van Keeken | G01M 3/12 |
| | | | | 73/865.9 |
| 2005/0184523 | A1 * | 8/2005 | Stravitz | F16L 25/14 |
| | | | | 285/903 |
| 2009/0108579 | A1 * | 4/2009 | Vorley | B25B 27/16 |
| | | | | 285/39 |
| 2013/0174395 | A1 * | 7/2013 | Kim | B23P 19/04 |
| | | | | 29/282 |
| 2013/0341907 | A1 * | 12/2013 | Lutzer | F16L 1/10 |
| | | | | 285/39 |
| 2014/0311583 | A1 * | 10/2014 | Jans | F16L 23/02 |
| | | | | 137/15.09 |
| 2015/0130180 | A1 * | 5/2015 | Fontenot | F16L 23/003 |
| | | | | 285/15 |
| 2018/0135786 | A1 * | 5/2018 | Bourbon | F16L 23/04 |
| 2023/0001551 | A1 * | 1/2023 | Averett | B25B 27/10 |
| 2025/0109812 | A1 * | 4/2025 | Bongiorno | F16L 23/003 |
| 2025/0198552 | A1 * | 6/2025 | Krüger | F16L 23/08 |

* cited by examiner

TOOL AND METHOD FOR ONE-HANDED MANIPULATION AND PLACEMENT OF CONDUIT-JOINING SLEEVE

FIELD OF THE DISCLOSURE

This disclosure relates generally to tools used in the joining of conduits, and more particularly to tools and methods that support one-handed manipulation and placement of a rigid cylindrical sleeve used to join pneumatic lines or fuel lines such as those found onboard aircraft.

BACKGROUND

Pneumatic lines and fuel lines are used extensively throughout all types of aircraft. When ends of two pneumatic lines or ends of two fuel lines must be connected, it is common to employ what is known as a "Wiggins" fitting to create the necessary sealed connection between two lines. Since the integrity of pneumatic lines and fuel lines is critical for aircraft, proper Wiggins fitting installations are essential in aircraft maintenance. Briefly, a Wiggins fitting consists of an open-ended, rigid cylindrical sleeve and a cylindrical clamp. When properly positioned, the sleeve fits snugly over both ends of two lines that are to be connected and the clamp holds the sleeve in place.

During installation of a Wiggins fitting, the critical and tedious portion of the installation operation involves proper positioning of the sleeve without damaging the sleeve. The manipulation and proper placement of the sleeve can take multiple attempts spanning hours for five reasons. First, there is an extremely tight diametric mating tolerance between a sleeve and the portions of the two lines that the sleeve engages. Second, the sleeve's structural integrity must be pristine as any dimensional distortions, dents, and/or nicks in the sleeve can render the sleeve useless. Three, in order to properly position a sleeve to achieve the proper seal with the connected lines, an installation technician currently uses conventional tools (e.g., screwdrivers, hammers, wrenches, etc.) to apply a motive force to the sleeve during its manipulation and placement that frequently introduces unwanted dimensional distortions, dents, and/or nicks in the sleeve. Fourth, the locations of many of these line connecting operations are difficult for the installation technician to reach and/or see. The fifth and sometimes most problematic reason is that the locations of the lines requiring connections are often in cramped areas that only allow a technician to use a single hand to perform the connection task. As a result, the critical installation of a Wiggins-fitting sleeve is frequently difficult, time consuming, and frustrating.

SUMMARY

In accordance with methods and systems described herein, a tool includes an open-ended cylinder having a first half-cylinder and a second half-cylinder. Each of the first half-cylinder and second half-cylinder has a first circumferential end and a second circumferential end. The first circumferential end of the first half-cylinder is hingedly coupled to the first circumferential end of the second half-cylinder. A retainer is coupled to the open-ended cylinder. The retainer has a spring-bias to automatically couple the first half-cylinder to the second half-cylinder when the second circumferential end of the first half-cylinder is in contact with the second circumferential end of the second half-cylinder. The retainer is also adapted to be operable by a single finger of a user's hand to overcome the spring-bias wherein the first half-cylinder and second half-cylinder are then free to move relative to one another. A first axial end of the open-ended cylinder is adapted to slidingly receive an open-ended sleeve. A second axial end of the open-ended cylinder has an annular ledge at an internal region of the open-ended cylinder. The annular ledge is adapted to annularly seat against the open-ended sleeve so that the open-ended cylinder fully encases the open-ended sleeve. A set of apertures extend through radial walls of the open-ended cylinder. Each such aperture includes a portion located a distance from the annular ledge that is greater than an axial length of the open-ended sleeve.

BRIEF DESCRIPTION OF THE DRAWINGS

Other objects, features and advantages of the methods and systems described in the present disclosure will become apparent upon reference to the following description of the preferred embodiments and to the drawings, wherein corresponding reference characters indicate corresponding parts throughout the several views of the drawings and wherein.

DETAILED DESCRIPTION

Figure 1:
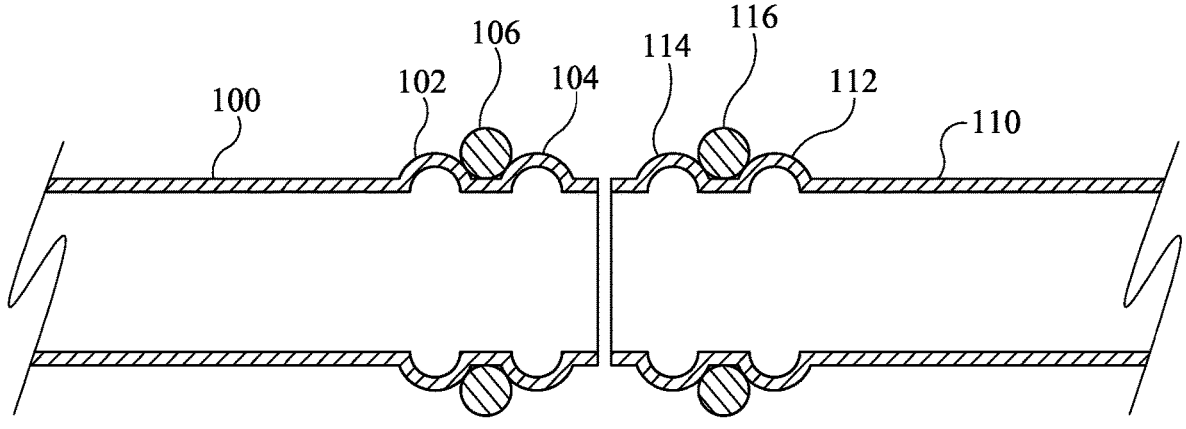
FIG. 1 is a cross-sectional view of the ends of two conventional pneumatic lines or two conventional fuel lines that are to be connected and sealed by a Wiggins fitting.
Figure 2:
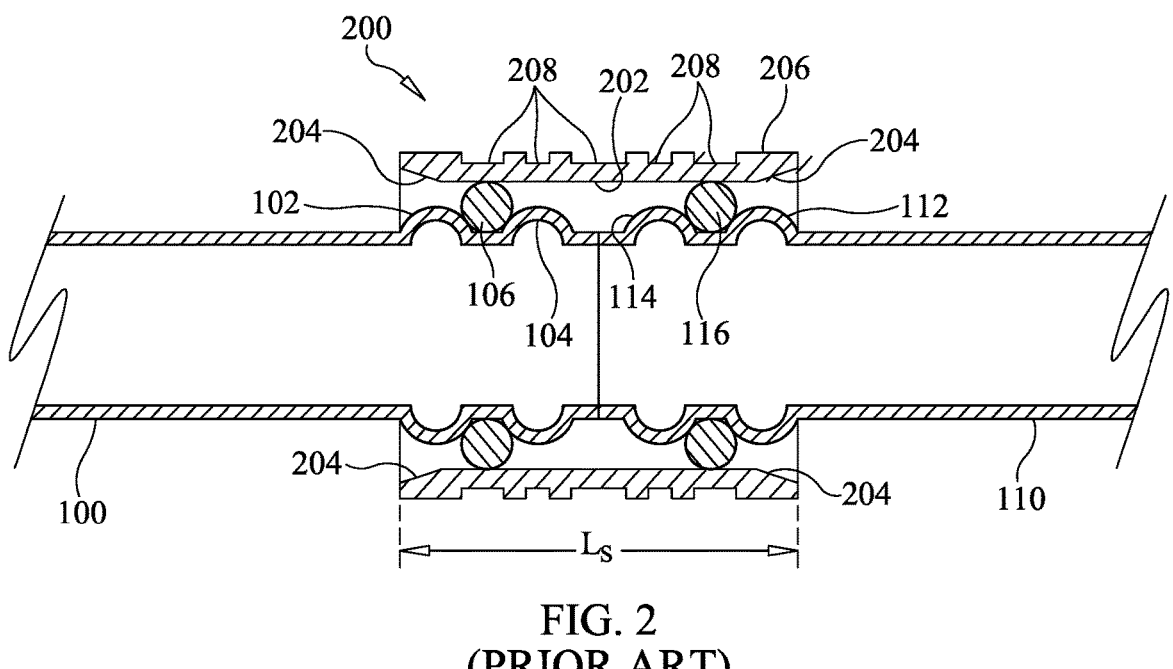
FIG. 2 is a cross-sectional view of the ends of the two lines in FIG. 1 with a conventional Wiggins-fitting sleeve properly positioned thereon.

Referring now to the drawings, simultaneous reference will be made to FIGS. 1 and 2 where cross-sectional views of the ends of two pneumatic conduits/lines or fuel conduits/lines of the type that are generally connected using a Wiggins fitting. As is known in the art, a Wiggins fitting includes a cylindrical sleeve and a cylindrical clamp. The cylindrical sleeve and cylindrical clamp are not part of the present invention. FIG. 1 illustrates two conventional cylindrical lines 100 and 110 prior to the joining thereof by a cylindrical sleeve of a Wiggins fitting. As is known in the art, lines 100 and 110 are typically in axial alignment with one another (as shown) prior to the installation of a Wiggins-fitting sleeve. FIG. 2 illustrates lines 100 and 110 after a Wiggins-fitting sleeve 200 (hereinafter referred to simply as open-ended sleeve 200 or sleeve 200) has been properly manipulated and placed such that a portion of each line 100 and 110 is fitted in sleeve 200. It is critical that sleeve 200 be properly positioned without incurring any damage.

As is known in the art, lines 100 and 110 are configured identically in terms of their end structure. That is, the outboard end of line 100 has two spaced-apart annular ferrules 102/104 with an O-ring 106 captured there between. Similarly, the outboard end of line 110 has two spaced-apart annular ferrules 112/114 with an O-ring 116 captured there between. Sleeve 200 has a smooth inside surface 202 that sealingly engages O-rings 106/116 when sleeve 200 is properly positioned over the ends of lines 100 and 110 as illustrated in FIG. 2. The axial ends of sleeve 200 at inside surface 202 may typically be tapered radially outward at 204 to facilitate manipulation of sleeve 200 during a placement operation. Sleeve 200 is configured such that its axial length "$L_S$" allows all annular ferrules 102, 104, 112 and 114 to be encased within sleeve 200 when sleeve 200 is properly positioned as shown in FIG. 2. Outer surface 206 of sleeve 200 may have multiple annular grooves 208 that mate with portions of a conventional Wiggins clamp (not shown) once sleeve 200 is properly positioned as shown in FIG. 2. Installation of a conventional Wiggins clamp on a properly positioned sleeve 200 is a straightforward and well-known operation that is not a limitation of the present invention.

As mentioned previously herein, the tight tolerances between lines 100/110 and sleeve 200 make the manipulation and placement of sleeve 200 a difficult task without applying some type of mechanical pressure or force to an axial end of sleeve 200 and/or an external radial face of sleeve 200. Unfortunately, the need to maintain shape/size integrity of sleeve 200 to ensure a perfect seal with O-rings 106/116 makes it extremely difficult to apply non-damaging axial or radial forces to sleeve 200 using conventional aircraft maintenance tools such as screwdrivers, hammers, wrenches, etc. These issues are further exacerbated in cases where the sleeve-placing technician only has room to utilize one hand to manipulate and properly place sleeve 200, and then remove/retrieve whatever tool may have been used to aid in the manipulation and placement of the sleeve.

The present invention is a tool that provides for one-handed manipulation of sleeve 200 to assure proper placement of sleeve 200. In addition, the tool protects and guarantees shape/size integrity of sleeve 200, and drastically reduces the time required for proper/safe manipulation/placement of sleeve 200 as well as the subsequent removal and retrieval of the tool. While the present disclosure assumes that sleeve 200 is a Wiggins-fitting sleeve, it is to be understood that the tool described herein may be used to facilitate one-handed manipulation and placement of any type of open-ended sleeve.

Figure 5:
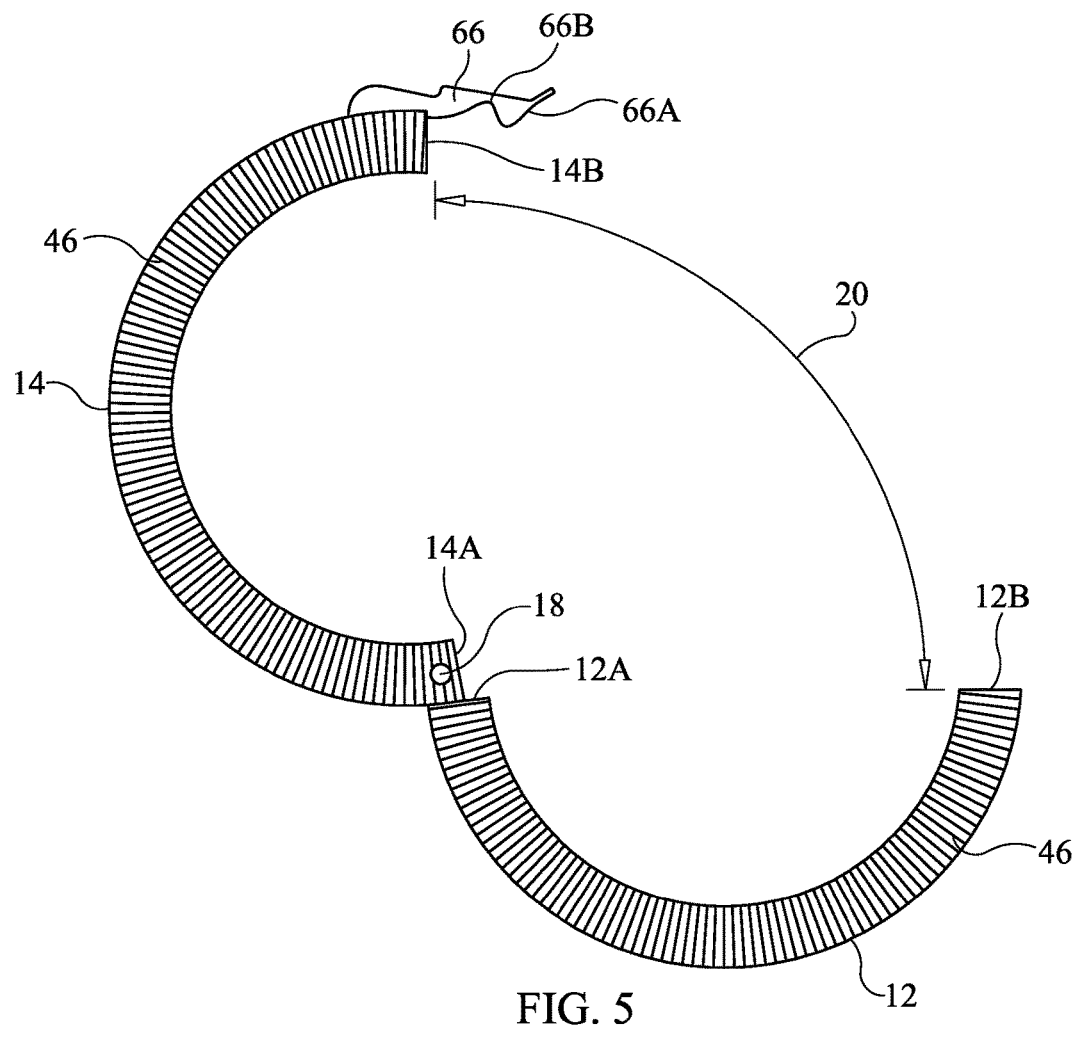
FIG. 5 illustrates an end view of the tool in its open position as viewed from the sleeve-retaining end of the tool in accordance with various aspects as described herein.
Figure 6:
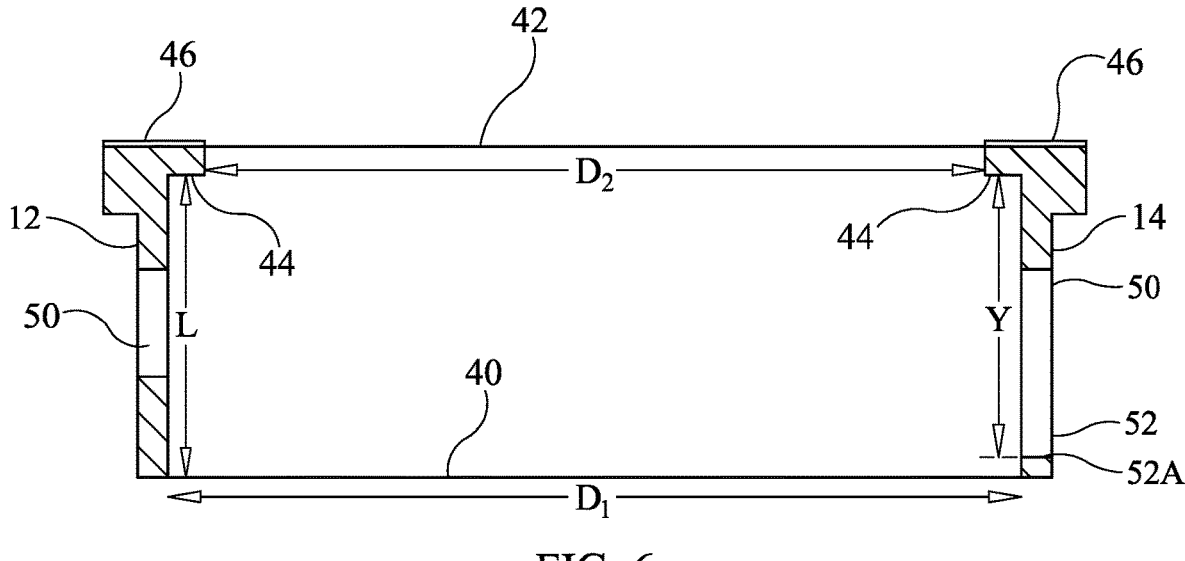
FIG. 6 illustrates a cross-sectional view of the tool taken along line 6-6 in FIG. 3 in accordance with various aspects as described herein.

Referring now simultaneously to FIG. 3-6, a one-handed sleeve manipulation tool in accordance with an embodiment of the present disclosure is shown in a perspective view (FIG. 3), in two axial end views thereof (i.e., tool is closed in FIG. 4 and open in FIG. 5), and in a cross-sectional view thereof (FIG. 6). The tool is referenced generally by numeral 10. It is to be understood that some features of tool 10 to be described herein will not be visible in all views thereof. Tool 10 may be made of a rigid material(s) typically used in the manufacture of machine tools and may include stainless steel.

Tool 10 has two sections 12 and 14, each of which is a half-cylinder as best seen in FIG. 5. One circumferential end 12A of section 12 is hingedly coupled to one circumferential end 14A of section 14 at a hinge joint 16 that can be configured as a finger joint hinge. As would be understood in the art, a hinge pin 18 (FIGS. 3-5) passes through finger joint hinge 16 such that sections 12/14 can rotate about hinge pin 18. In some embodiments, finger joint hinge 16 may be configured such that sections 12 and 14 can experience relative rotation of at least 90° as indicated by two-headed arrow 20 (FIG. 5) such that each of half-cylinder sections 12 and 14 is unencumbered by the other half-cylinder section when tool 10 is fully opened as shown in FIG. 5. In this way, either half-cylinder section 12 or 14 may be readily positioned about a Wiggins fitting sleeve as will be explained further below.

Figures 3, 4:
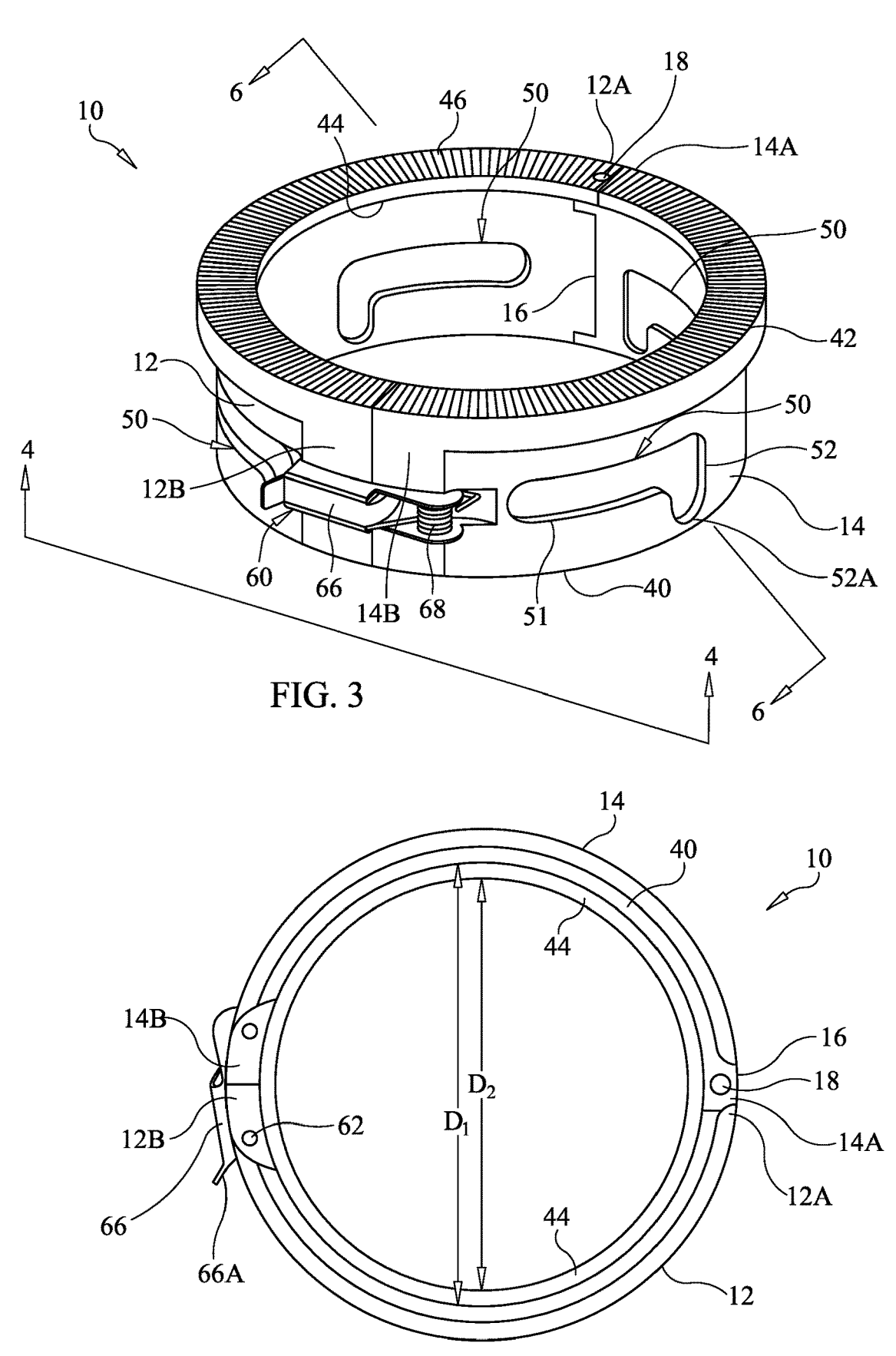
FIG. 3 illustrates a perspective view of one embodiment of a one-handed sleeve manipulator and placement tool in its closed position in accordance with various aspects as described herein.
FIG. 4 illustrates an end view of the tool taken along line 4-4 in FIG. 3 depicting the sleeve-receiving end of the tool in accordance with various aspects as described herein.

When in its closed position as shown in FIGS. 3, 4 and 6, one open axial end 40 of tool 10 has a diameter "$D_1$" sized to slidingly receive a Wiggins-fitting sleeve such as the above-described sleeve 200. As will be explained further below, the entirety of a Wiggins-fitting sleeve fits axially within tool 10 such that the sleeve is encased by tool 10. The other open axial end 42 of tool 10 in its closed position is configured to define an interior annular ledge 44 that extends partially and radially into tool 10 to form a stop for the sleeve fitted in tool 10 thereby preventing an encased sleeve from exiting open axial end 42. The sleeve is properly positioned in tool 10 when the sleeve annularly seats against annular ledge 44. The interior axial length "L" (FIG. 6) of tool 10 measured from open axial end 40 to interior annular ledge 44 is greater than the axial length $L_S$ (FIG. 2) of a sleeve that tool 10 will be used to manipulate and position thereby ensuring that the sleeve is protected.

When tool 10 is in its closed position, the inside diameter "D₂" defined by annular ledge 44 (FIG. 4) is larger than the outside diameter of a line it will be disposed about, but smaller than the outside diameter of the pneumatic or fuel lines' annular ferrules (e.g., previously-described annular ferrules 102/104 or 112/114 and as shown in FIGS. 1-2). The axial external end face of end 42 (formed when sections 12 and 14 are coupled together at circumferential ends 12B and 14B, respectively) may include indentations or be knurled as indicated by reference numeral 46 for non-slip cooperation with a technician's hand or with a conventional or specialized tool used to apply force to axial end 42 as will be explained further below.

As mentioned above, an open-ended sleeve (e.g., sleeve 200 shown in FIG. 2) that is to be placed by tool 10 is properly positioned in the tool when the sleeve is annularly seated against the tool's annular ledge 44. Since the sleeve will be fully encased within tool 10, it may be difficult for a technician to tell if the sleeve is properly seated in tool 10. That is, because tool 10 is sized to slidingly but snugly receive an open-ended sleeve, it is possible for the sleeve to be canted and/or wedged at an angle in the tool such that the sleeve does not fully seat against annular ledge 44. In addition, the close quarters where tool 10 is to be used makes the retrieval of a dropped tool very difficult. To alleviate these problems, tool 10 has a set of tool retrieval and sleeve alignment apertures 50 that extend through the radial walls of tool 10 that will be explained with simultaneous reference will be made to FIGS. 3, 6 and 7.

The apertures' tool retrieval features allow tool 10 to be easily retrieved using some type of hooked tool (not shown) if/when the tool is dropped in a cramped work environment. Briefly, each of apertures 50 includes a longer portion 51 and a shorter portion 52 that is contiguous with portion 51. Longer portion 51 provides a technician with a relatively large region to receive a hooked tool (not shown), while shorter portion 52 provides a capture area for a hooked tool to settle in as the tool is being retrieved using the hooked tool.

Figure 7:
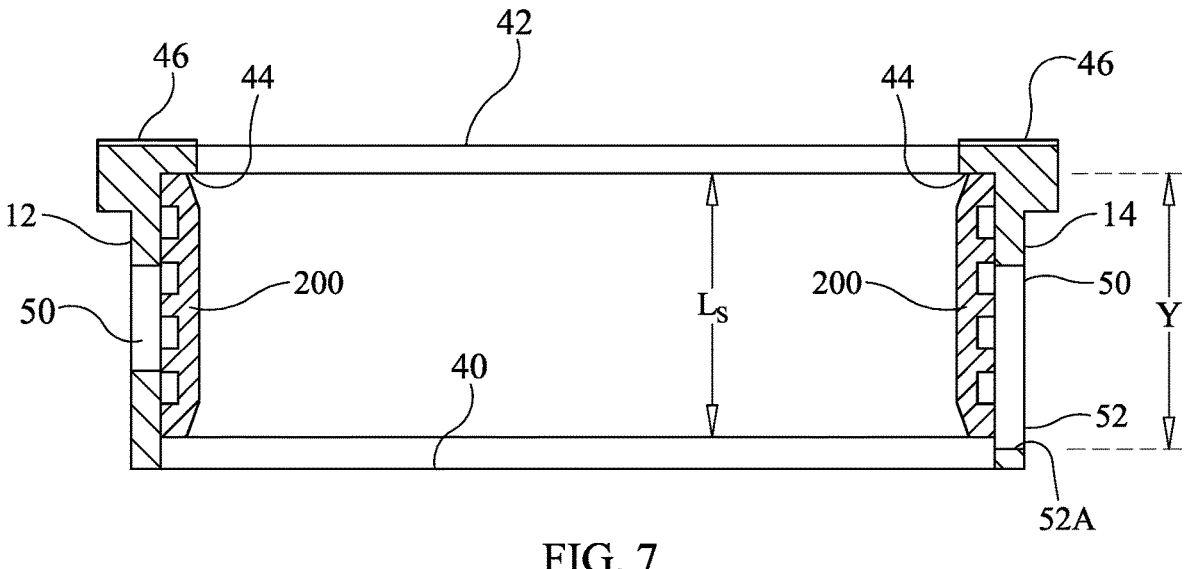
FIG. 7 illustrates the cross-sectional view of the tool shown in FIG. 6 with an open-ended sleeve properly positioned in the tool in accordance with various aspects as described herein.

In terms of the apertures' sleeve alignment features, portion 52 has an outboard end 52A located an axial distance "Y" (FIG. 6) from annular ledge 44 where distance Y is greater than the axial length Ls of the sleeve (e.g., sleeve 200 shown in FIGS. 2 and 7) such that one axial end of sleeve 200 is visible in portions 52 of apertures 50 when the other axial end of sleeve 200 is seated against annular ledge 44 as shown in FIG. 7. In this way, a technician can readily see that the sleeve is properly seated in the tool.

Figure 8A:
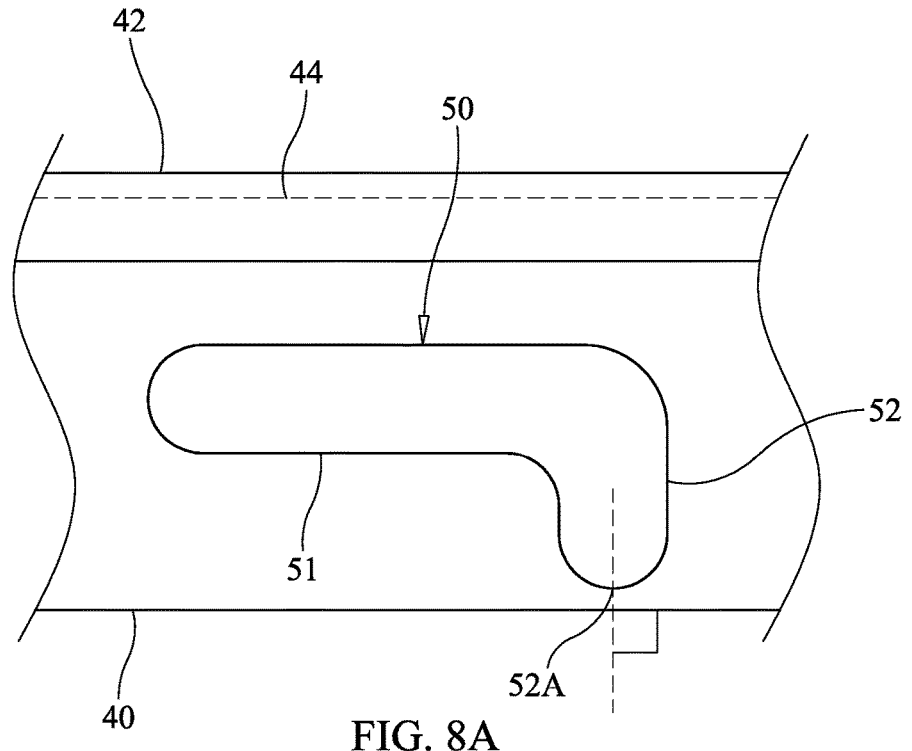
FIG. 8A is a side view of a portion of the tool illustrating an embodiment of one tool retrieval and sleeve alignment aperture in accordance with various aspects as described herein.
Figure 8B:
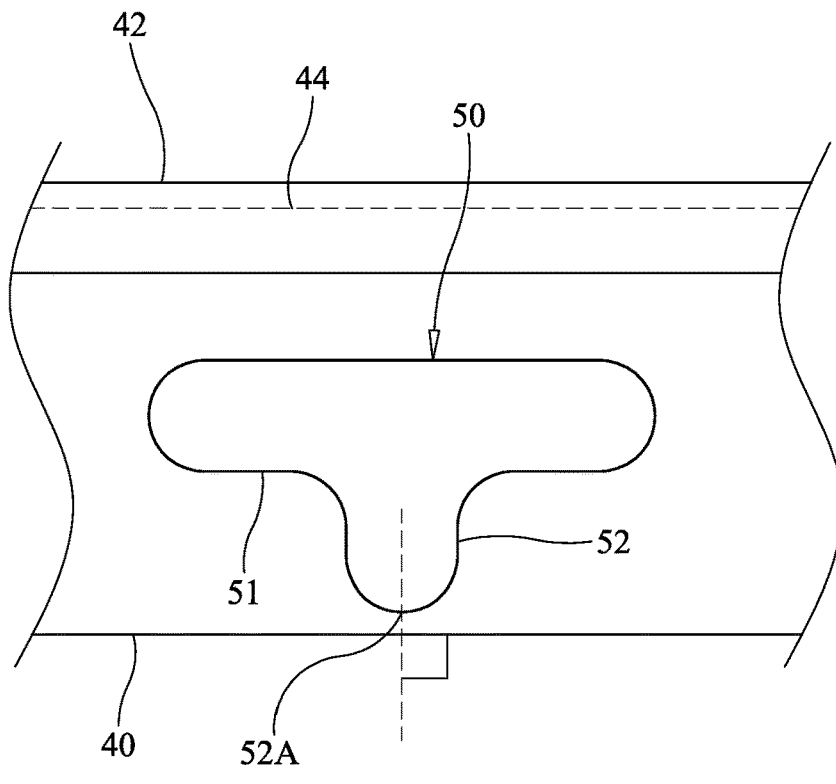
FIG. 8B is a side view of a portion of the tool illustrating another embodiment of one tool retrieval and sleeve alignment aperture in accordance with various aspects as described herein.
Figure 8C:
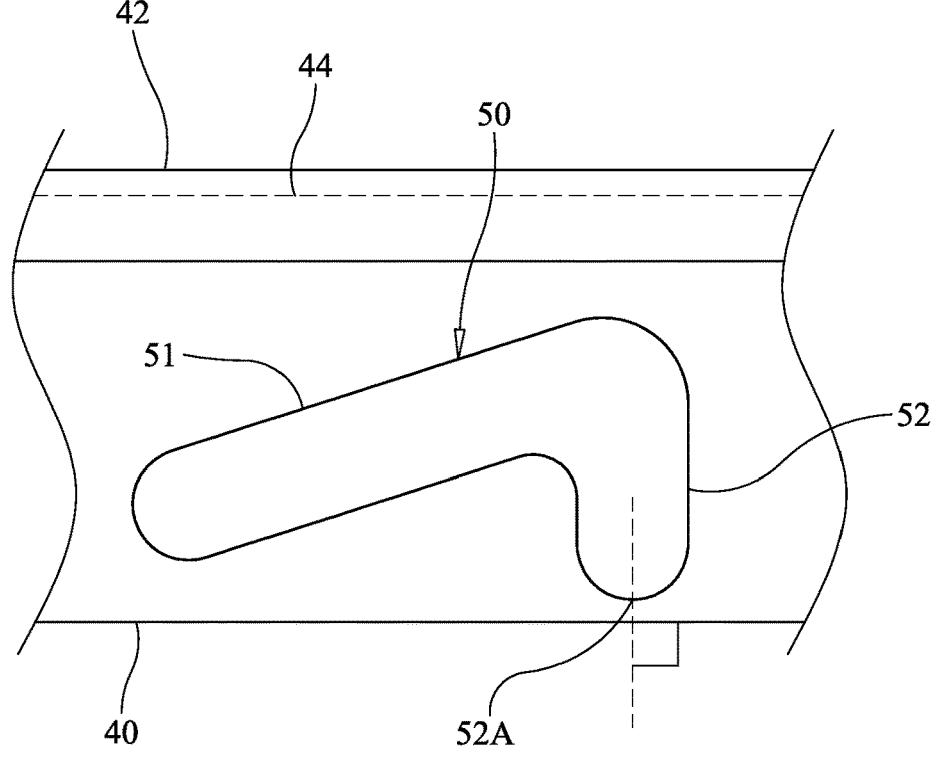
FIG. 8C is a side view of a portion of the tool illustrating another embodiment of one tool retrieval and sleeve alignment aperture in accordance with various aspects as described herein.
Figure 8D:
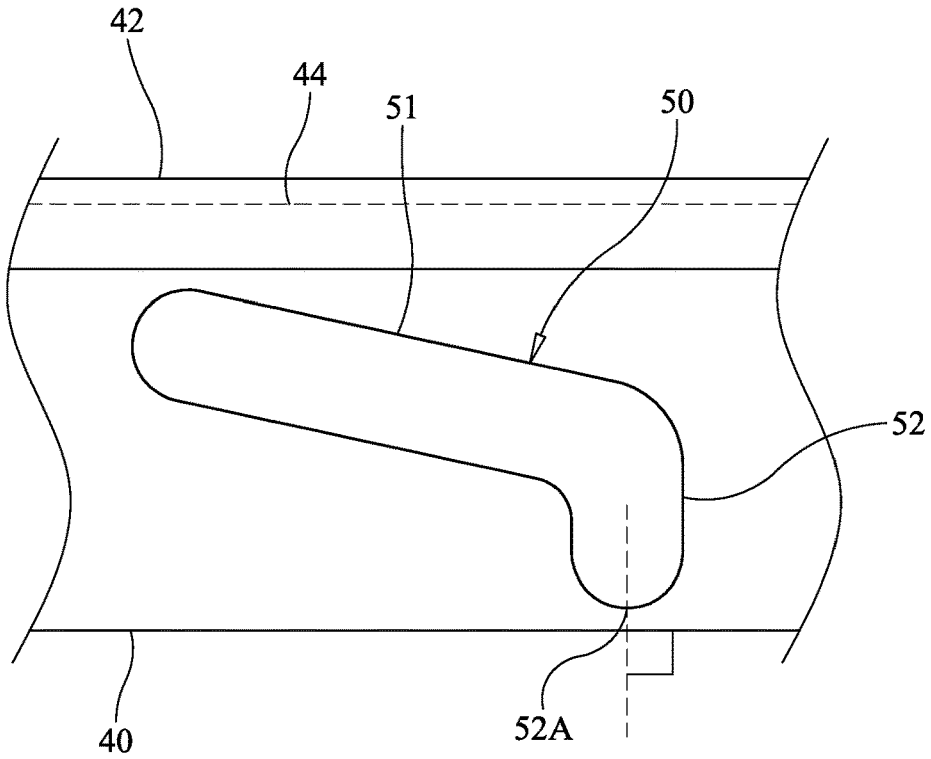
FIG. 8D is a side view of a portion of the tool illustrating another embodiment of one tool retrieval and sleeve alignment aperture in accordance with various aspects as described herein.

In the illustrated example of aperture 50 which is also shown in isolation in FIG. 8A, aperture 50 has a first portion 51 that extends parallel to open axial end 40 and a second portion 52 that is contiguous with first portion 51 and perpendicular to open axial end 40. It is to be understood that apertures 50 are not limited to the "L" or "J" shape shown in FIG. 8A. For example, in some embodiments, aperture 50 may be configured in a "T" shape as illustrated in FIG. 8B where portion 52 is still contiguous with portion 51 and is still perpendicular to open axial end 40. In some embodiments, portion 51 of an aperture 50 may be canted at an acute angle relative to open axial end 40 as shown in FIG. 8C, or at an obtuse angle relative to open axial end 40 as shown in FIG. 8D. In some embodiments, all of apertures 50 for a tool may be the same. In some embodiments, a tool's apertures 50 may include a mixture of different configurations. However, in all cases, each aperture 50 will include a portion that is located an axial distance (i.e., distance Y shown in FIG. 6) from the tool's annular ledge 44 that is greater than the axial length Ls (FIG. 2) of the sleeve that will be encased by the tool.

Figure 9:
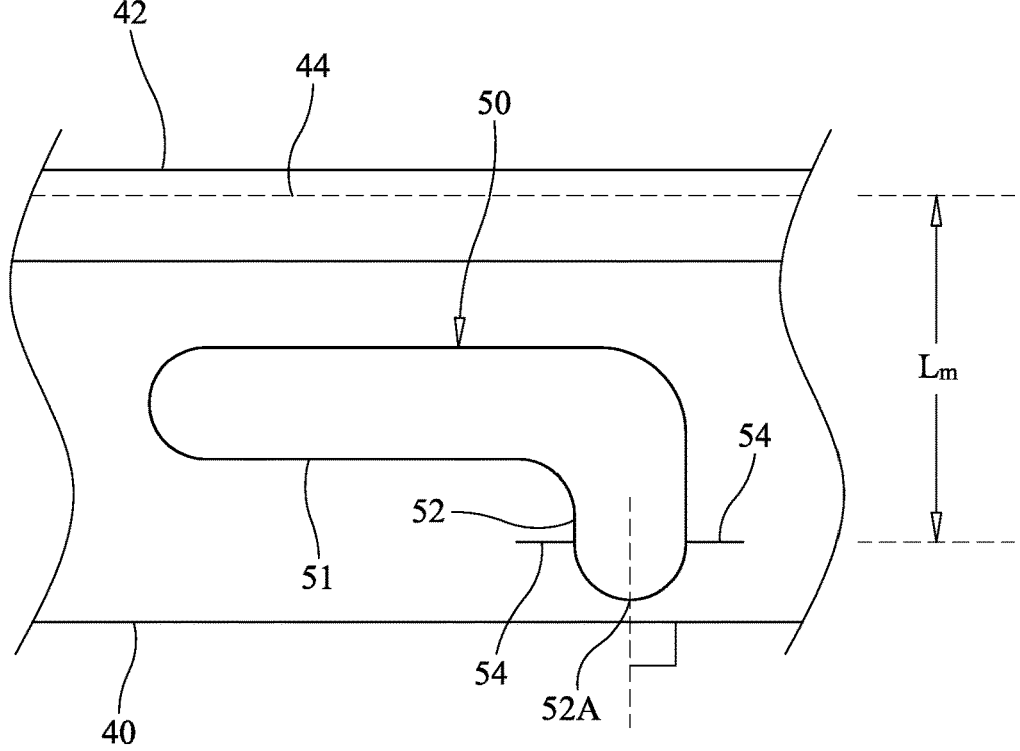
FIG. 9 is a side view of a portion of the tool illustrating an embodiment of a tool retrieval and sleeve alignment aperture having sleeve alignment markings adjacent thereto in accordance with various aspects as described herein.

In some embodiments and as illustrated in FIG. 9, a set of markings 54 may be provided on tool 10. Each marking 54 is adjacent to portion 52 of an aperture 50 to provide an indication of where the axial end of a sleeve should be when the sleeve is fully seated against the tool's annular ledge as described above. That is, each marking 54 is located an axial distance ("L_M") from the tool's annular ledge 44 where axial distance L_M is equal to the axial length Ls (FIG. 2) of the sleeve that is to be encased by the tool. Markings 54 may be two-dimensional and/or three-dimensional without departing from the scope of the present disclosure. Markings may be placed on the outside of the tool, on the inside of the tool, or on the inside and outside of the tool.

In general, one-handed use of tool 10 is made possible by a spring-biased retainer that engages and keeps tool 10 in its closed state when circumferential ends 12B/14B are in contact with one another, and that may be operated/opened by a single finger of a technician's hand. That is, the retainer automatically couples half-cylinders 12/14 when circumferential ends 12B/14B are brought into contact, and allows a technician to hold the tool while simultaneously uncoupling the half-cylinders at circumferential ends 12B/14B. Once the half-cylinders are uncoupled, half-cylinders 12/14 are free to move/rotate relative to one another about hinge 16.

Figure 10:
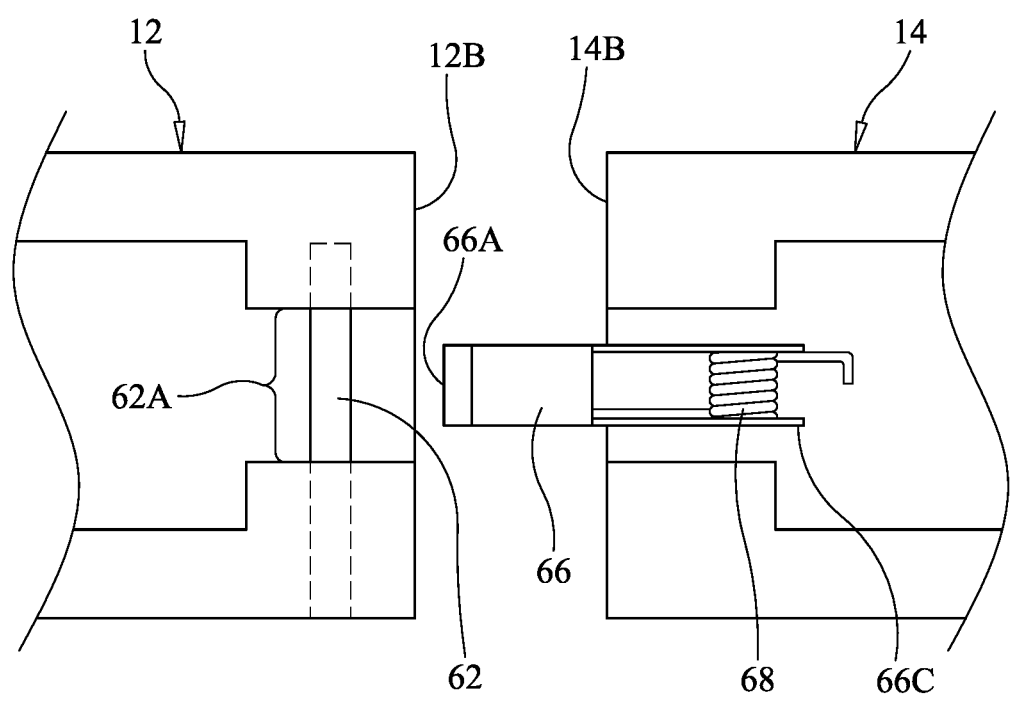
FIG. 10 is side view of a portion of the sleeve manipulator and placement tool illustrating the tool's latch disengaged from the tool's catch in accordance with various aspects as described herein.

In the illustrated embodiment, the retainer is referenced generally by numeral 60 in FIG. 3, is shown in greater detail in FIG. 10, and is shown in isolated views thereof in FIGS. 11A-11D to illustrate the retainer's operational states. Not all features of retainer 60 are visible in all figures. Accordingly, the following description will make simultaneous reference to FIGS. 3, 10, and 11A-11D.

Retainer 60 includes a catch bar 62 and a spring-loaded latch 64. Catch bar 62 is coupled to half-cylinder 12 at its circumferential end 12B as illustrated in FIG.

Figure 11A:
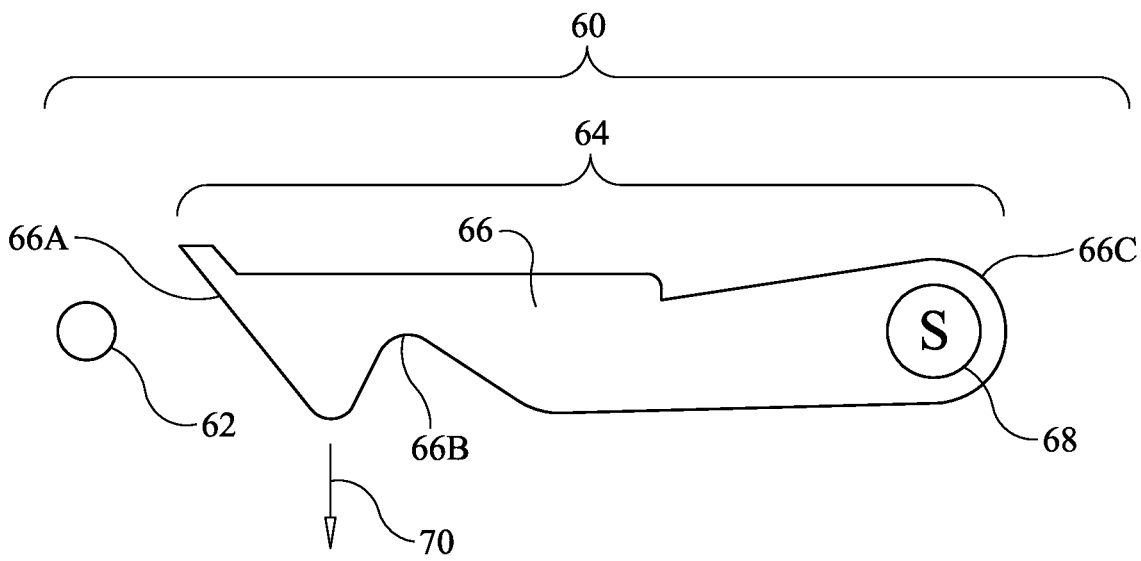
FIG. 11A is an isolated side view of the tool's catch and latch prior to their engagement in accordance with various aspects as described herein.
Figure 11B:
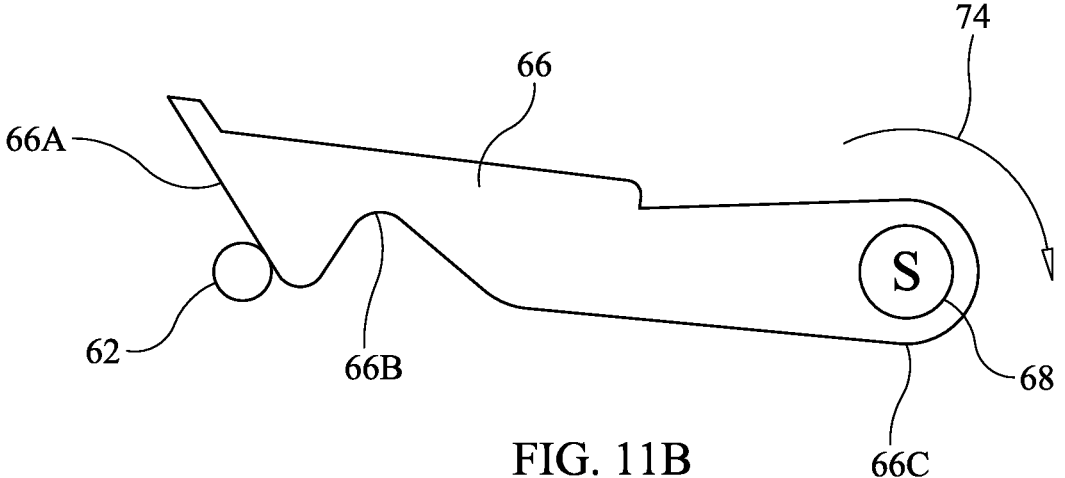
FIG. 11B is an isolated side view of the tool's catch and latch at the commencement of their engagement in accordance with various aspects as described herein.
Figure 11C:
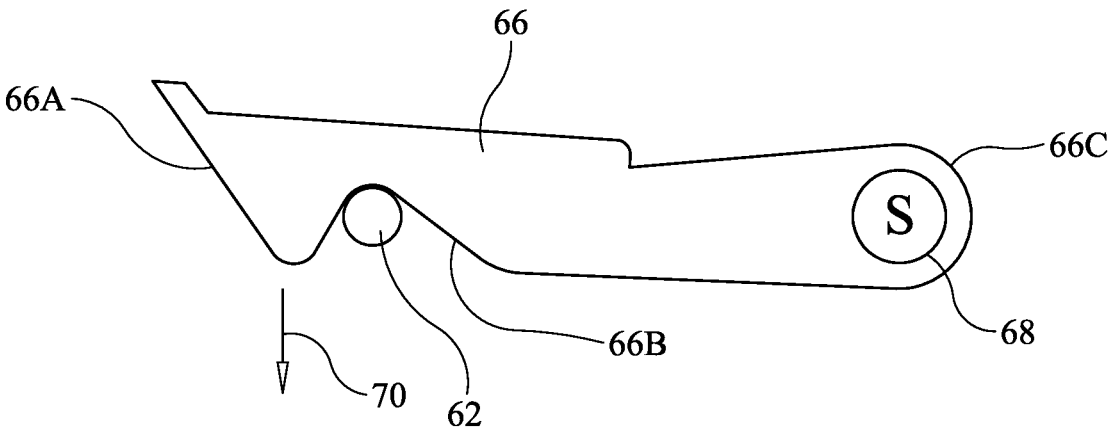
FIG. 11C is an isolated side view of the tool's catch engaged by the latch in accordance with various aspects as described herein.
Figure 11D:
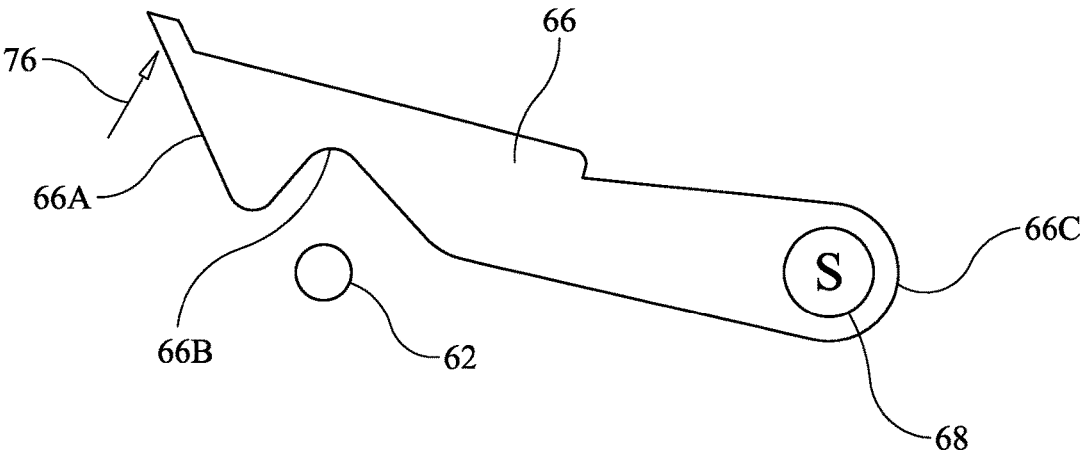
FIG. 11D is an isolated side view of the tool's latch with a technician's disengagement force being applied thereto in accordance with various aspects as described herein.

10. Catch bar 62 is positioned to extend axially along half-cylinder 12 with an exposed portion 62A available for engagement by spring-loaded latch 64 when circumferential ends 12B/14B are brought into contact with one another (FIG. 3). Latch 64 includes a rigid latch arm 66 and a spring ("S" in FIGS. 11A-11D) 68. Latch arm 66 includes a beveled outboard end 66A and a hook 66B adjacent to outboard end 66A. Spring 68 may be a torsion spring that couples the other end 66C of latch arm 66 to circumferential end 14B of half-cylinder 14 as best seen in FIG. 10. Spring 68 biases latch arm 66 (to include hook 66B) radially inward as controlled by the spring's biasing force as indicated by arrow 70 in FIG. 11A. As circumferential ends 12B/14B are brought close enough to one another such that beveled outboard end 66A contacts catch bar 62 as shown in FIG. 11B, the biasing force of spring 68 is exceeded so that latch arm 66 rotates radially outward about spring 68 as indicated by rotational arrow 74. Once circumferential ends 12B/14B contact one another, hook 66B is aligned with catch bar 62 such that bias force 70 is again active to rotate latch arm 66 about spring 68 so that hook 66B engages catch bar 62 as shown in FIG. 11C. To disengage hook 66B from catch bar 62, a technician need only push on beveled end 66A (with a force indicated by arrow 76 in FIG. 11D) using a single finger (not shown). Once latch arm 66 is disengaged from catch bar 62, the tool's two half-cylinders are free to move/rotate relative to one another as described above.

To use tool 10, a sleeve (e.g., the above-described sleeve 200) is positioned on a first line that is to be joined but away from its ferrule/O-ring end. For example, the first line's O-ring can be temporarily removed thereby allowing the sleeve to be readily slid over the line's annular ferrules. The O-ring is then re-installed between the first line's annular ferrules. Using one hand, a technician then places tool 10 near where the connection task is to be performed. Using that same hand, the technician opens tool 10 by disengaging retainer 60 as described above and places one of half-cylinder sections 12 or 14 about the sleeve with the tool's open axial end 40 located closest to or facing the first line's ferrule/O-ring end. Tool 10 is closed by the technician using the same hand where the tool's retainer 60 automatically coupled the tools' half-cylinders and maintains the tool in its closed position about the sleeve and line as described above. At this point, tool 10 completely encases and protects the sleeve. With the sleeve fully protected, the technician may verify that the sleeve is properly seated against the tool's annular ledge using apertures 50 as described above. Once the proper seating of the sleeve is verified, forces may be applied to the tool (e.g., at the axial external end face of axial end 42) using the same hand with or without the aid of a conventional tool such as a flat-head screwdriver. Axial pressure may be applied to end 42 in increments at different circumferential locations on axial end 42. The axial pressure applied to tool 10 is distributed evenly about the axial end of the sleeve by annular ledge 44.

The manipulation of tool 10 along with the encased/protected sleeve proceeds over the first line's ferrule/O-ring end and, subsequently, over the ferrule/O-ring end of the to-be-joined second line. The inside diameter $D_2$ defined by the interior of annular ledge 44 causes annular ledge 44 to engage with the first of two annular ferrules on the first line to prevent further axial movement of tool 10 and the sleeve encased thereby. When this occurs, the sleeve is properly positioned over both lines (as shown in FIG. 2) and tool 10 can be opened and removed. That is, once the sleeve has been manipulated into its proper location, the technician may use one finger from the same hand that has been used throughout the process to quickly open retainer 60 as described above.

The advantages of the present invention are numerous. The above-described tool provides for the one-handed manipulation and correct placement of a Wiggins-fitting sleeve on two pneumatic lines or fuel lines when the lines are placed end-to-end, and then provide for the subsequent one-handed removal of the tool. The tool provides the means to drastically reduce the time it takes for an aircraft maintenance task that must be performed on a regular basis. The tool protects the Wiggins-fitting sleeve from damage to ensure the integrity of the ultimate line connection.

Figure 12:
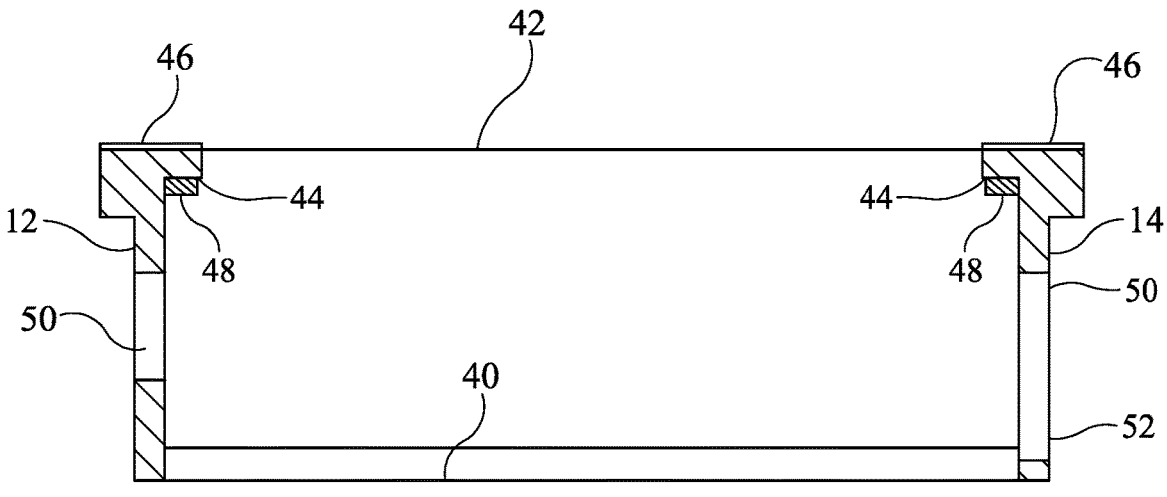
FIG. 12 is a cross-sectional view of another embodiment of a one-handed sleeve manipulator and placement tool further including a cushion material disposed on the tool's annular ledge in accordance with various aspects as described herein.

Although the methods and systems presented herein have been described for specific embodiments thereof, there are numerous variations and modifications that will be readily apparent to those skilled in the art in light of the above teachings. For example, in some embodiments and as shown in FIG. 12, a cushion material 48 (e.g., rubber) can be disposed on interior annular ledge 44 for further protection of the axial end of a sleeve during an installation operation. It is therefore to be understood that, within the scope of the appended claims, the methods and systems presented herein may be practiced other than as specifically described.

What is claimed as new and desired to be secured by Letters Patent of the United States is:

The invention claimed is:

1. A tool, comprising:
an open-ended cylinder having a first half-cylinder and a second half-cylinder, each of said first half-cylinder and said second half-cylinder having a first circumferential end and a second circumferential end, wherein said first circumferential end of said first half-cylinder is hingedly coupled to said first circumferential end of said second half-cylinder;
a retainer attached to exterior portions of said open-ended cylinder, said retainer having a spring-bias for automatically coupling said first half-cylinder to said second half-cylinder when said second circumferential end of said first half-cylinder is in contact with said second circumferential end of said second half-cylinder;
a first axial end of said open-ended cylinder having a first internal diameter $D_1$;
a second axial end of said open-ended cylinder having an annular ledge at an internal region of said open-ended cylinder, wherein said open-ended cylinder has a second internal diameter $D_2$ at said annular ledge wherein $D_1 > D_2$, and wherein a constant internal diameter of said open-ended cylinder between said first axial end and said annular ledge is equal to said first internal diameter $D_1$;
said open-ended cylinder having an internal length L between said first axial end and said annular ledge; and
a set of apertures extending through radial walls of said open-ended cylinder and distributed circumferentially about said open-ended cylinder, each aperture from said set of apertures including a portion located a distance Y from said annular ledge that is less than said internal length L.

2. The tool of claim 1, further comprising:
a set of markings on said open-ended cylinder, each marking from said set of markings adjacent to one said portion, wherein a distance $L_m$ from said annular ledge to said each marking is less than said distance Y.

* * * * *